US008036665B2

(12) United States Patent
Shah (10) Patent No.: US 8,036,665 B2
(45) Date of Patent: Oct. 11, 2011

(54) WIRELESS MOBILE STATION CALL HANDOFF (75) Inventor: Dipesh H. Shah, Fermont, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 1018 days.

(21) Appl. No.: 10/976,143

(22) Filed: Oct. 28, 2004

(65) Prior Publication Data
US 2006/0094430 A1 May 4, 2006

(51) Int. Cl.
H04W 36/00 (2009.01)
H04W 4/00 (2009.01)
(52) U.S. Cl. ........................................ 455/438; 370/331
(58) Field of Classification Search .................. 455/436, 455/438; 370/331
See application file for complete search history.

(56) References Cited

U.S. PATENT DOCUMENTS

| 5,329,635 | A | * | 7/1994 | Wadin et al. | 455/438 |
|---|---|---|---|---|---|
| 5,379,446 | A | * | 1/1995 | Murase | 455/444 |
| 5,396,648 | A | * | 3/1995 | Patsiokas et al. | 455/509 |
| 5,499,386 | A | * | 3/1996 | Karlsson | 455/444 |
| 5,987,099 | A | * | 11/1999 | O'Neill et al. | 455/436 |
| 6,321,089 | B1 | * | 11/2001 | Han | 455/436 |
| RE37,669 | E | * | 4/2002 | Kawano | 455/436 |
| 6,434,386 | B1 | * | 8/2002 | Lundborg | 455/436 |
| 6,445,917 | B1 | * | 9/2002 | Bark et al. | 455/423 |
| 6,594,238 | B1 | * | 7/2003 | Wallentin et al. | 370/252 |
| 6,597,911 | B1 | * | 7/2003 | Kransmo | 455/436 |
| 7,003,310 | B1 | * | 2/2006 | Youssefmir et al. | 455/522 |
| 7,043,243 | B2 | * | 5/2006 | Kobylinski et al. | 455/437 |
| 7,184,419 | B2 | * | 2/2007 | Hwang et al. | 370/331 |
| 7,272,409 | B2 | * | 9/2007 | Dillon et al. | 455/522 |
| 7,471,659 | B2 | * | 12/2008 | Huang et al. | 370/335 |
| 2001/0004596 | A1 | * | 6/2001 | Steijer et al. | 455/436 |
| 2001/0041537 | A1 | * | 11/2001 | Simonsson et al. | 455/67.1 |
| 2002/0068566 | A1 | * | 6/2002 | Ohlsson et al. | 455/436 |
| 2002/0119755 | A1 | * | 8/2002 | Taketsugu | 455/67.3 |
| 2003/0073463 | A1 | * | 4/2003 | Shapira | 455/562 |
| 2004/0106407 | A1 | * | 6/2004 | Kikuma et al. | 455/436 |
| 2004/0110477 | A1 | * | 6/2004 | Nishimura et al. | 455/127.1 |
| 2004/0116133 | A1 | * | 6/2004 | Kalhan et al. | 455/456.2 |
| 2004/0147264 | A1 | * | 7/2004 | Ogawa | 455/441 |

(Continued)

FOREIGN PATENT DOCUMENTS
WO    WO 2005089009 A1 *  9/2005

OTHER PUBLICATIONS

Author: Kyriazakos, Sofoklis A.; Title of Article: "Location-aided handover in cellular systems of present and future generation"; Type of submission: presentation; National Technical University of Athens (Athens, Georgia); dated Jun. 7, 2001; 35 pages.

Primary Examiner — Christopher M Brandt
(74) Attorney, Agent, or Firm — Turocy & Watson, LLP (57) ABSTRACT Communication handoff in a radio telecommunications network in which a quality measurement between a mobile wireless device and a first fixed transceiving entity in the radio telecommunications network is obtained in readiness for potentially handing off the communication. A quality driven handoff is initiated when the quality measurement falls within a range of values defined by a first quality threshold and a second quality threshold.

26 Claims, 5 Drawing Sheets

U.S. PATENT DOCUMENTS

| | | | |
|---|---|---|---|
| 2004/0170191 A1* | 9/2004 | Guo et al. | 370/468 |
| 2004/0214575 A1* | 10/2004 | Jovanovic | 455/444 |
| 2004/0266434 A1* | 12/2004 | Lehtinen et al. | 455/436 |
| 2005/0036462 A1* | 2/2005 | Sillasto et al. | 370/331 |
| 2005/0043026 A1* | 2/2005 | Brok et al. | 455/434 |
| 2005/0059400 A1* | 3/2005 | Jagadeesan et al. | 455/436 |
| 2005/0096053 A1* | 5/2005 | Liu et al. | 455/439 |
| 2005/0136928 A1* | 6/2005 | Zaki | 455/436 |
| 2005/0215254 A1* | 9/2005 | Pedersen et al. | 455/436 |
| 2005/0233746 A1* | 10/2005 | Laroia et al. | 455/436 |
| 2006/0035639 A1* | 2/2006 | Etemad et al. | 455/436 |
| 2008/0218414 A1* | 9/2008 | Hagerman et al. | 342/368 |

* cited by examiner

WIRELESS MOBILE STATION CALL HANDOFF

TECHNICAL FIELD OF THE INVENTION

The present invention relates generally to telecommunications and, more particularly to call handoff in a wireless telecommunications network.

BACKGROUND OF THE INVENTION

In recent years, the use of wireless communication devices has greatly increased. Specifically, the use of mobile cellular telephones has become common place such that many users, or subscribers, to cellular services use cellular telephones with regularity. One particular advantage of mobile cellular telephones is that when installed in an automobile or otherwise used away from the home or office, cellular telephones provide users with the freedom of travel without losing the ability to be constantly linked to a communications net work.

The coverage area of a cellular telecommunications network including mobile cellular telephones is divided into smaller coverage areas called "cells" that use transmitters and receivers. As is well known in the art, the limited coverage area of each cell typically allows the radio channels used in one cell to be reused in another cell. In a typical cellular telecommunications network, as a mobile cellular telephone within one cell moves near or across the boundary of the cell, control circuitry associated with the cell monitors the signal strength to determine if it would be advantageous to transfer the call to the adjacent cell. Indeed, in one known scheme, if the signal strength to that mobile telephone from signals originating in the adjacent cell is stronger than the signal strength for signals originating in the present cell, communications with the mobile telephone are "handed off" (transferred) to the adjacent cell. Handoff can also include a transfer from one traffic channel to another traffic channel on the same cell or an adjacent cell.

Typically, the cellular network uses signal strength and/or some other signal quality measurement reported by the mobile devices as well as signal strength and other signal quality measurements performed by base station receivers to evaluate whether to hand off the call. Conventionally, if the signal strength or quality falls below a predetermined threshold, the system automatically initiates a call handoff. Unfortunately, if the signal strength or quality is well below the threshold at the time of the handoff, the communication link may be severed during the handoff. This is so because for the handoff to be successful, a certain call quality ordinarily must be maintained.

Therefore, a need exists for a method and system for controlling a call in a cellular telecommunications network to effect call handoffs, while improving quality of service and/or minimizing dropped calls resulting from such handoffs.

SUMMARY OF THE INVENTION

Briefly described, in a first preferred form the present invention comprises a method and system for handoff of communications from a mobile wireless device in a radio telephone network system. In accordance with the present invention, signal strength and/or other signal quality measurement of a communication between a mobile wireless device and a base station of the radio telephone network is taken in readiness for potentially handing off the communication. A quality-driven handoff is initiated when the quality measurement falls within a range of values defined by a first quality threshold and a second quality threshold.

Preferably, initiating a hand off includes continuing to maintain the communication with the current serving entity while the quality measurement remains below the second quality threshold. If the quality measurement rises to a level that is equal to or above the second quality threshold, the handoff can be initiated at that time.

Further, the quality based handoff can be one of the following many types of handoffs:

a. Intra-cell TCH [Traffic Channel]-TCH handoff, i.e. handoff from one TCH to another TCH of the same cell sector.

b. Inter-cell, Intra-site TCH-TCH handoff, i.e. handoff from TCH on one cell sector to TCH on another cell sector of the same cell site.

c. Inter-cell, Intra-BSC TCH-TCH handoff, i.e. handoff from TCH on one cell sector to TCH on another cell sector of a different cell site on the same BSC.

d. Inter-cell, Inter-BSC TCH-TCH handoff, i.e. handoff from TCH on one cell sector to TCH on another cell sector of a different cell site on a different BSC.

e. Inter-cell, Inter-MSC TCH-TCH handoff, i.e. handoff from TCH on one cell sector to TCH on another cell sector of a different cell site on a different MSC.

f. Inter-cell, Intra-site SACCH-SACCH handoff, i.e. handoff from SACCH on one cell sector to SACCH on another cell sector of the same cell site.

g. Inter-cell, Intra-BSC SACCH-SACCH handoff, i.e. handoff from SACCH on one cell sector to SACCH on another cell sector of a different cell site on the same BSC.

h. Inter-cell, Inter-BSC SACCH-SACCH handoff, i.e. handoff from SACCH on one cell sector to SACCH on another cell sector of a different cell site on a different BSC.

i. Inter-cell, Inter-MSC SACCH-SACCH handoff, i.e. handoff from SACCH on one cell sector to SACCH on another cell sector of a-different cell site on a different MSC.

The quality measurement can be a measurement of the signal strength or of the signal clarity. Alternatively, it can be a measurement of the accuracy of information passing back and forth between the mobile wireless device and the base station, or it can be other measurements. One quality measurement that can be employed according to the present invention is a measure known in the industry as "receive quality" (RXQUAL). RXQUAL is known in the wireless mobile communications industry as an air interface quality parameter and, more particularly it is a logarithmic measure of the bit error rate (BER) quantized in eight levels; zero is the lowest BER (i.e., best performance) and seven is the worst case. Thus, a larger numerical value is indicative of a lower call quality and a lower numerical value is indicative of a higher call quality. For example, if RXQUAL is used as the quality measurement for determining whether to initiate a handoff, the handoff may be initiated when the RXQUAL measurement is some particular numerical value or is within some numerical range (e.g., numerically equal to or greater than five and less than seven).

Other quality measurements may be utilized to determine whether a handoff is to be initiated. For example, a quality measurement known as carrier-to-interface ratio (C/I) can be utilized for this purpose. Another quality measurement that may be utilized for this purpose is a measurement of frame error rate. Yet another quality measurement that may be used for this purpose is known in the wireless industry as the "receive level" (RXLEV) measurement, which is a signal strength measurement quantized into, for example, 64 levels. Other quality measurements may also be used for this purpose. Moreover, while the present invention is described with specific reference to comparing a single quality measurement with upper and lower thresholds, multiple quality parameters can be compared with upper and lower thresholds to make the decision of whether to initiate a call handoff. In other words, it is possible to consider multiple quality parameters in making the decision of whether to initiate the call handoff.

Moreover, one way of carrying out the present invention is to utilize current data, or the most current (most recent) data, for the quality measurement to evaluate whether to initiate the call handoff or not. Alternatively, data from the previous measurements may be taken into account. For example, very recent information about the quality measurement could be considered alone or in conjunction with the previous quality measurement in deciding whether to handoff the call or not, still utilizing upper and lower thresholds.

The present invention takes advantage of the recognition that even when call quality is very poor, it is possible to maintain the communication link with the base station in situations where it would be difficult if not impossible to successfully handoff at that moment. In other words, in accordance with the invention, it has been discovered that maintaining a link (even a tenuous one) with the current base station is more easily accomplished than effecting a handoff in circumstances of very poor signal quality. The invention provides a variety of ways to exploit this discovery.

DETAILED DESCRIPTION OF THE INVENTION

The present invention is directed to a method and system for handoff of a communication from a mobile wireless device in a radio telephone network. The present invention will be described with particular reference to the presently preferred exemplary embodiments. However, it should be understood that embodiments described herein are only a few examples of the many ways in which the present invention can be implemented.

Figure 1:
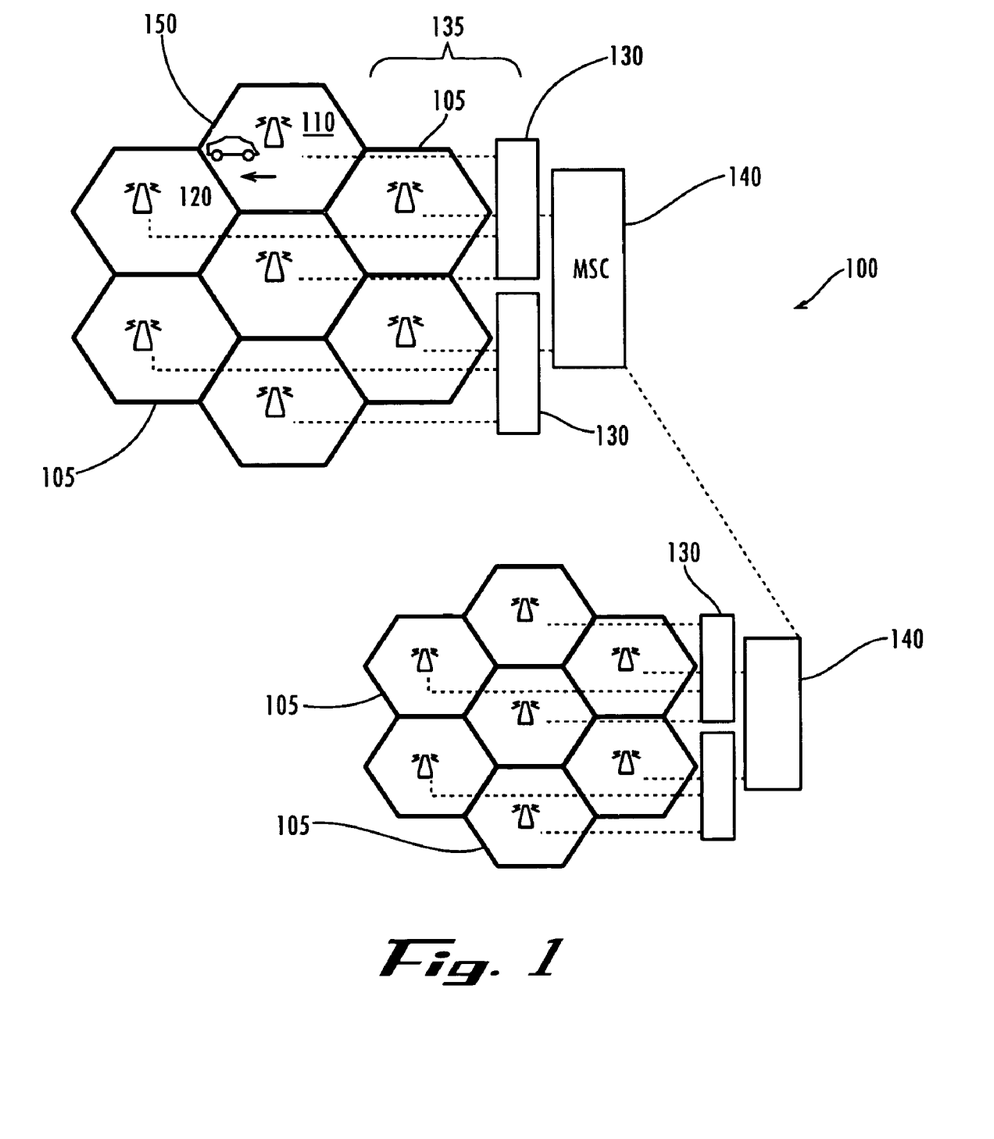
FIG. 1 shows a simplified conventional radio telephone network.

A brief description of a known process as applied to a radio telephone network will now be presented. A simplified conventional radio telephone network 100 is shown in FIG. 1. The radio telephone network 100 includes the mobile switching center 140 (MSC), the cell and its base transceiver station 105 (also called a base station, or BS), base station controllers 130 (BSC), mobile wireless device 150 (also called a mobile station, or MS). The mobile station (MS) 150 contains the mobile transceiver that is frequency-agile enabling the MS 150 to tune to a particular frequency designated for it to use by the network 100.

As is known, the cell site contains the base station (BS) 105, which manages the air interface between the MS 150 and the network 100. Radio resource management can be performed in BS 105 and/or BSC 130 and/or MSC 140 as well. As is known, the cell sites can be subdivided into sectors in which each sector may include its own transceiver. By receiving signals and directions from the MSC 140 and/or BSC 130, the BS 105 sends and receives traffic to/from the MS 150.

The MSC 140 manages operation for many BSs (via the BSC if it is used) and is responsible for switching the calls to the cells, providing for backup, interfacing with other telephone networks (such as other MSCs), monitoring traffic for charging activities, and overall network management. Certain functions are delegated to the BS 105 or BCS 130, such as radio resource management, link diagnostics, link setups, and so on. But the MSC 140 knows about most of these activities, even though it might not be performing all of them.

If the wireless network 100 is equipped with BSC(s), the BSs are controlled by the BSCs in which each BSC controls several BSs. The BSS 135 and/or MSC 140 are responsible for handoff operations of the calls as well as controlling the power signals and frequency administration between the BS 105 and MS 150; that is, radio resource management. The BS 105 and BSC 130 may be co-located, the BSC 130 may be stand alone, the BSC 130 may be located at the mobile services switching center MSC 140, or it may not be used.

In order for the MS 150 to communicate in the network 100, a radio link is established with a first BS 110. If this radio link becomes too weak or if another cell with better radio link is available, another link is initiated for handing off the communication to prevent the communication from being dropped. For example, when the MS 150 moves away from the first BS 110, the radio link eventually becomes too weak to support communications there between and will eventually disconnect, resulting in the call in progress being dropped. Since this is not acceptable, as the MS 150 nears a second BS 120, a handoff is made in which a new communication radio link is made with the second BS 120 and communication with the old BS 110 is terminated. This type of handoff is known in the industry as an "inter-cell" handoff.

Another handoff type is the "intra-cell" handoff in which the channel associated with the call is changed within the current serving base station, e.g., when the current channel has a high level of interference. The change can apply to another frequency of the same base station or to another time slot of the same frequency. Further, in the "inter-cell/intra-BSC" handoff, there is a change in radio channel between two base stations that are served by the same base station controller. Additionally, in the "inter-BSC/intra-MSC" handoff, a connection is changed between two base stations that are served by different base station controllers but operate in the area of the same mobile switching center. In another type handoff [[know]] known as "inter-MSC" handoff, a connection is changed between two base stations that are in different mobile switching center areas. Further, handoff can include handing off of traffic channels and control channels.

Typically a call quality parameter (such as signal strength measurement) is used for determining whether to handoff a call. For example, RF signal strength of transmissions between the MS 150 and the BSs 110, 120 can be measured and used to determine when a handoff should occur and/or to determine which other BS the call should be handed off. It is known that a decreased signal strength between a base station and a mobile station indicates that the mobile station is nearing the edge of the cell served by the base station and is likely to need handing off to another cell. For example, the network controller (i.e., the MSC 140 or BSS 135) can perform an evaluation process known as "locating" in which a quality measurement parameter is monitored and a decision is made to handoff when the parameter falls below a predetermined threshold.

For purposes of providing an example of known handoff techniques, it will be assumed that MS 150 has an initial position associated with BS 110, but is moving in a direction, indicated by the arrow, to a position associated with an adjacent BS 120. The network controller continuously determines the "location" of MS 150. When the network controller determines, based on signal strength measurements, that MS 150 has moved too far from BS 110 for high-quality communication to be maintained for example, the network controller determines which other base station the MS 150 is moving to (i.e., by requesting signal strength measurements corresponding to cell sites adjacent to BS 110). The BS with the highest signal strength is typically selected as the base station to which the MS 150 is most likely moving. Subsequently, BS 120 (the base station to which the mobile station 150 is moving in this example) is directed to begin a process to initiate a radio link with the MS 150 and BS 110 is directed to begin a process to discontinue handling the call. In this way, the MS's call is handed-off to the base station receiving the strongest signal from the MS 150.

Figure 2A:
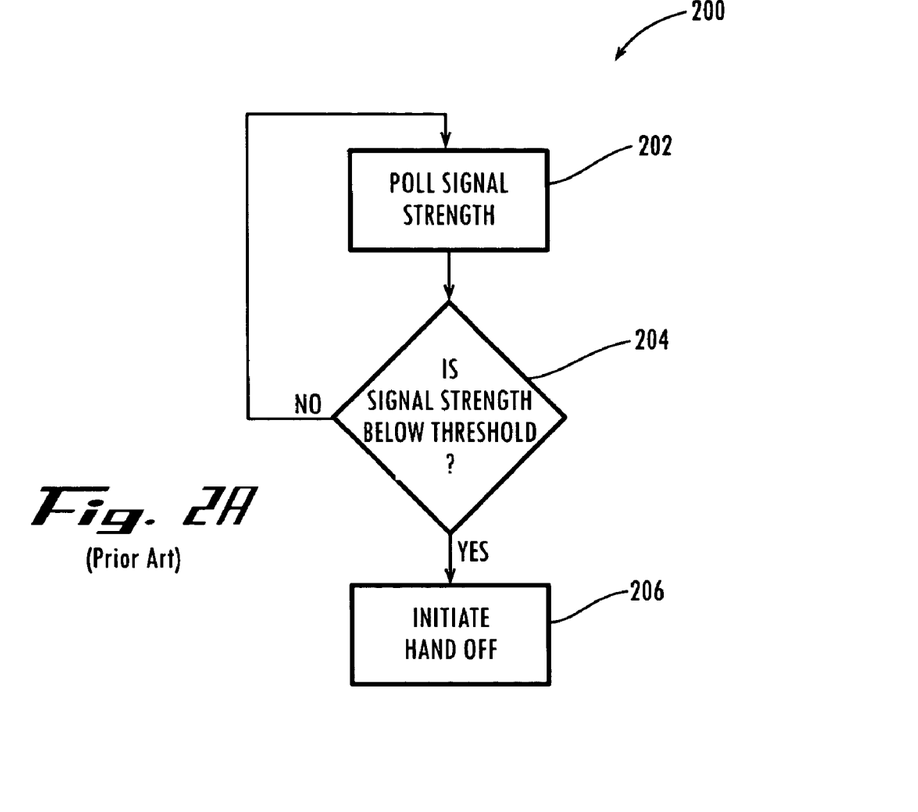
FIGS. 2A and 2B show a flow diagram and a graphical representation illustrating a known handoff methodology.

Referring now to FIG. 2A, there is shown a flow diagram 200 illustrating the above-described known handoff methodology. During a radio call, a signal strength is polled 202. This signal strength measurement can be determined by either the MS 150, the BS 110, or both, for example. Subsequently, a determination is made whether the monitored signal strength is below a predetermined threshold 204. For a negative determination, control is returned to the polling step 202, and for an affirmative determination control is passed on to initiate a call handoff 206. Similarly, a relative comparison of signal strength on the serving BS 110 and neighbor BS may be made to check if a neighboring BS can provide better signal to the MS 150. If so, a handover is initiated to the neighbor BS, otherwise the control is returned to the polling step 202.

Figure 2B:
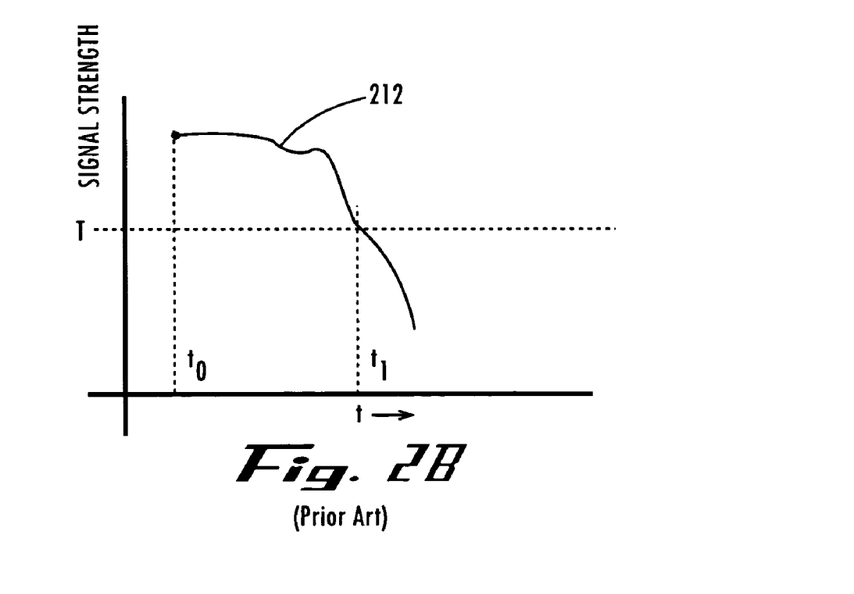

Referring now to FIG. 2B, there is shown a graphical representation further illustrating the handoff methodology described above and illustrated in FIG. 2A, in which call quality is indicated on the vertical axis and time is represented on the horizontal axis. Signal quality measurement T represents the predetermined threshold, line 212 indicates measurements of a call over a time period, $t_0$ represent time of call inception, and $t_1$ represents the time when the measured signal quality has fallen below T.

As shown, signal quality during an ongoing call is monitored and when the call quality between the serving base station and a mobile station falls below the predetermined threshold, a handoff is automatically initiated. However, a certain call quality must be maintained during the handoff procedure to complete a successful handoff. Thus, a handoff procedure performed while the call quality is below this certain quality often causes the call to be dropped. At some point the call quality becomes so poor that even the serving base station cannot maintain the call. However, an aspect of the present invention takes advantage of the recognition that even when call quality is very poor, it is possible to maintain the communication link with the current serving base station in situations where it would be difficult if not impossible to successfully handoff the call at that moment, thus improving communications quality and reliability of the radio telephone network. In other words, maintaining a link (even a tenuous one) is more easily accomplished than effecting a call handoff in circumstances of very poor call quality.

Figure 3A:
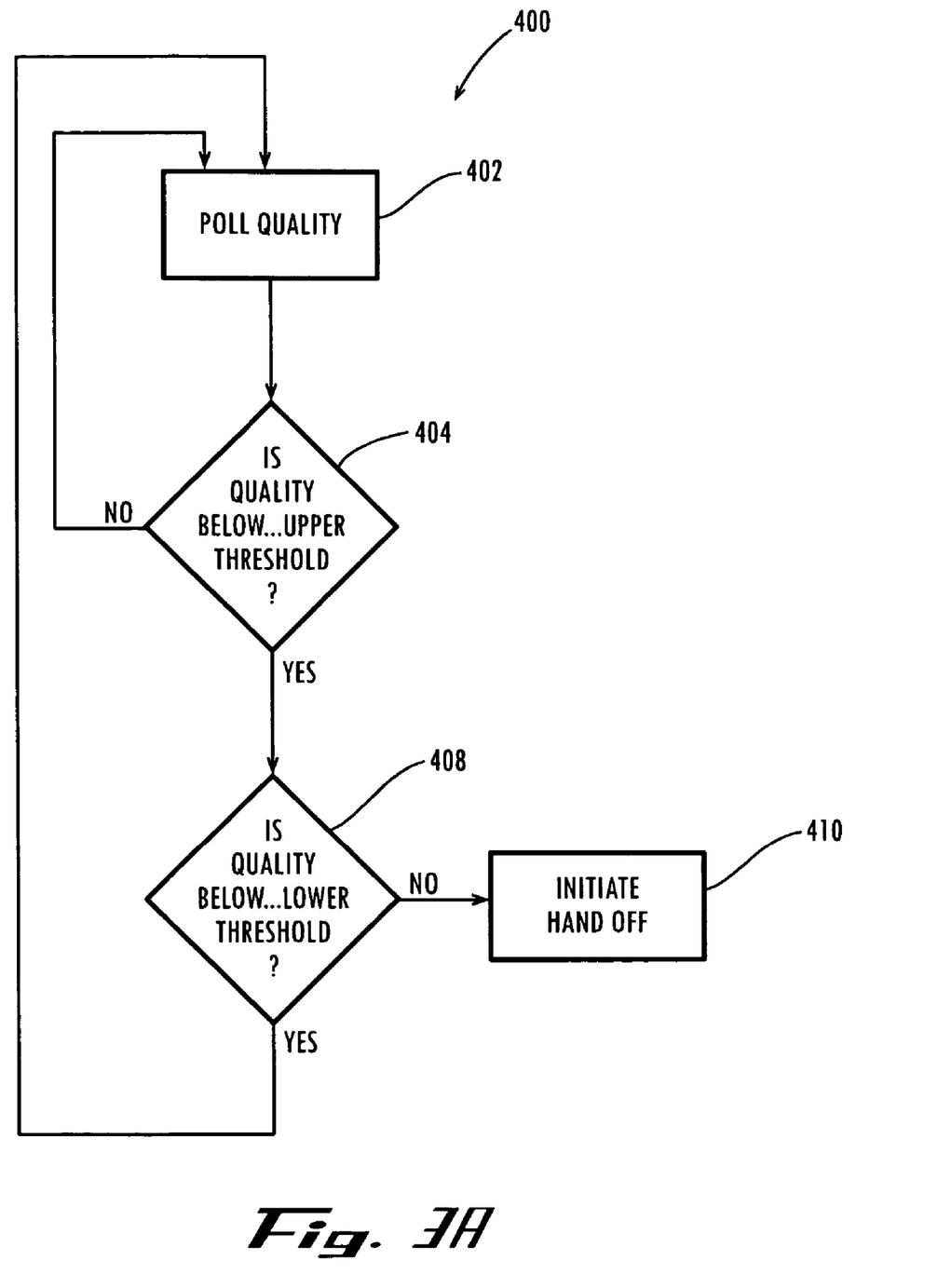
FIG. 3A shows a flow diagram illustrating a handoff scheme in accordance with exemplary embodiments of the present invention in which both an upper threshold and a lower threshold are used for determining whether a handoff is to be initiated.

Referring now to FIG. 3A, there is shown a flow diagram 400 illustrating a handoff scheme in accordance with exemplary embodiments of the present invention in which both an upper threshold and a lower threshold are used for determining whether a quality driven handoff is to be initiated. This scheme can be applied with the above-described radio telephone network, illustrated in FIG. 1. After a call has been established, a quality of the connection is polled, as indicated by block 402. Subsequently, a determination is made as to whether the quality is below an upper threshold, as indicated by block 404. If not, control is returned to the poll call quality step 402. If a determination is made that the quality is below the upper threshold, control is passed to decision block 408 for a determination as to whether the quality is below a lower threshold. If a determination is made that the quality is below the lower threshold, control is passed to the quality polling step 402 for further monitoring. If a determination is made that the quality is not below the lower threshold, control is passed to a conventional call handoff initiation process 410.

Figure 4:
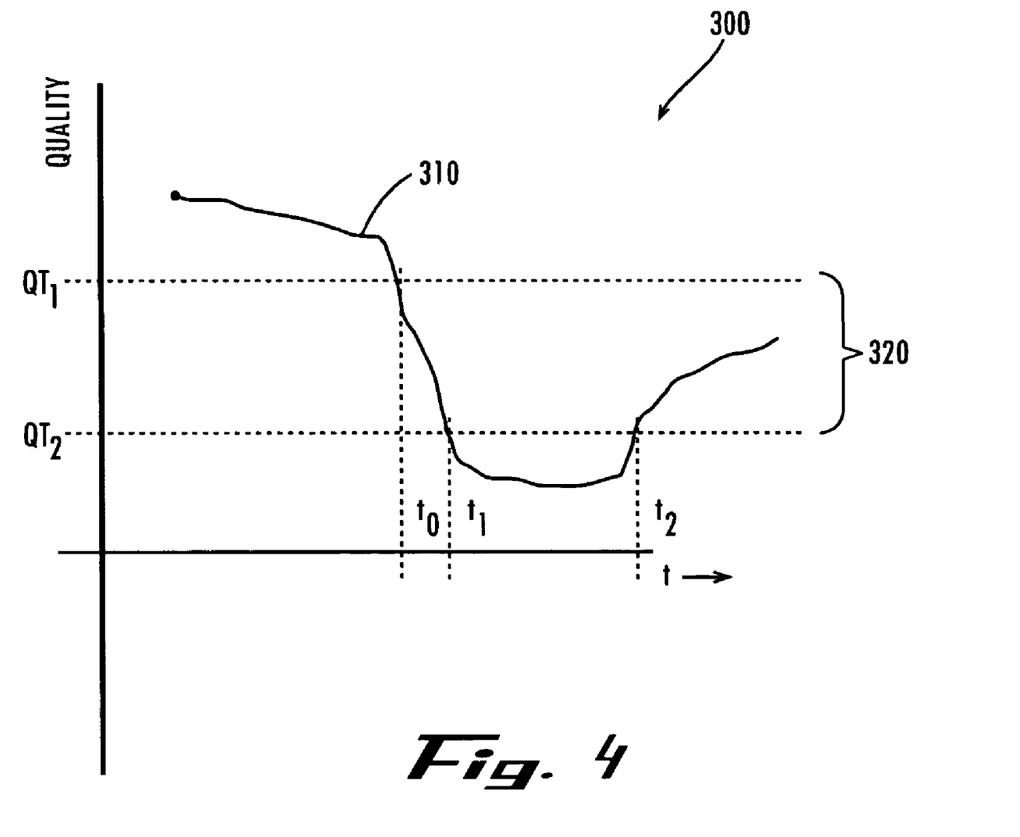
FIG. 4 shows a graphical representation further illustrating the handoff method illustrated in FIGS. 3A and 3B.

Referring now to FIG. 4 there is a graphical representation 300 further illustrating the handoff scheme shown in FIG. 3A. Quality is represented on the vertical axis, time is represented on the horizontal axis, and line 310 represents quality measurements over a period of time. Region 320, defined as that region between a predetermined upper quality threshold $Q_{T1}$ and a predetermined lower quality threshold $Q_{T2}$, represents a safe zone, according to the invention, for initiating a call handoff. The region below region 320 represents that tenuous zone in which call quality is so poor that call handoff is not to be initiated. In other words, maintaining a link in the tenuous zone with the current base station is more certain than effecting a successful call handoff. It should be noted that the region above region 320 is a good quality zone in which a call is maintained with the currently serving base station.

In this example, the call quality measurement 310 breaches or falls below the upper quality threshold $Q_{T1}$ at time $t_0$ and also breaches or falls below the lower quality threshold $Q_{T2}$ at time $t_1$. At some time later $t_2$, the quality measurement 310 rises back above the lower threshold $Q_{T2}$. Applying the scheme shown in FIG. 3A, for the time periods between $t_0$ and $t_1$ and after $t_2$, a determination would be made that the quality measurement is within the range between $Q_{T1}$ and $Q_{T2}$ and a call handoff would be initiated. However, for the time period between $t_1$ and $t_2$, quality driven call handoff would not be initiated. It should be noted that even though line 310 appears to be analog in nature, many quality measures are discrete in nature so that a smooth transition through the safe zone region 320 (such as that between $t_0$ and $t_1$) may not occur.

For example, in the conventional Global System for Mobile (GSM) network, the base station periodically monitors the uplink and downlink RF signal quality to determine if the assigned traffic channel (TCH) is providing good quality. It typically measures uplink signal strength measurement (RXLEV), uplink Bit Error Rate (RXQUAL), uplink Frame Error Rate and/or uplink carrier to interference ratio (C/I). Similarly, the MS measures the downlink RXLEV, downlink RXQUAL, and optionally, downlink FER and downlink C/I, and reports such to the base station over the Slow Associated Control Channel (SACCH).

Generally, the wireless operator specifies a downlink RXQUAL and uplink RXQUAL thresholds. If the RXQUAL, in either of the links, measured over a period of time exceeds the RXQUAL threshold for the respective link, the base station initiates a handoff. Similarly, C/I thresholds can be specified by the wireless operators such that when C/I, in either of the links, measured over the time period is below the C/I threshold for the respective link, the base station initiates a handoff. The handoff could be intra-cell handoff or inter-cell handoff. Such handoff would work well if the RXQUAL and/or C/I is not extremely bad, such that a handoff message cannot be successfully communicated. For example, if the RXQUAL is 5, i.e. 3.2 to 6.4% bit error rate (BER), the handoff messages typically can be successfully communicated. However, if the RXQUAL is 7, i.e. higher than 12.8% BER, the handoff message communication is likely to fail, causing handoff failure or call drop.

Aspects of the present invention take advantage of the recognition that if the handoff were not attempted when there is such a high BER, there are several SACCH frames worth of time (based on Radio Link Timer settings) before the call is dropped due to inability to detect SACCH. Within these SACCH frame intervals while radio link timer is ticking (or S-counter is decrementing), if C/I or RXQUAL improves such that the handoff message can be successfully communicated, the handoff would be attempted with higher likeliness of this handoff being successful.

In accordance with one embodiment of the present invention, the system operator of the GSM network will specifies the following four thresholds: a) Uplink RXQUAL threshold for handoff lower limit (ULRXQLL); b) Uplink RXQUAL threshold for handoff upper limit (ULRXQUL); c) Downlink RXQUAL threshold for handoff lower limit (DLRXQLL); and d) Downlink RXQUAL threshold for handoff upper limit (DLRXQUL). Based on the RXQUAL measurements over each SACCH frames, the base station can average the measurements over an interval, weigh them and/or deploy a weighting algorithm to determine an "effective" RXQUAL for each link. When the effective downlink RXQUAL is higher than the DLRXQLL and lower than DLRXQUL, the downlink RXQUAL based handoff (inter-cell or intra-cell) is triggered. In addition, the base station can deploy lower and upper limits for Frame Error Rate (FER) to trigger FER based inter-cell or intra-cell handoffs. Further, the base station can deploy lower and upper limits for C/I thresholds to trigger C/I based inter-cell or intra-cell handoffs. Also, a variant can be deployed where "less than or equal to" is applied instead of "less than" and "greater than or equal to" is applied instead of "greater than".

Further, in accordance with exemplary embodiments of the present invention, the quality based handoff can be one of the following many types of handoffs:

a. Intra-cell TCH-TCH handoff, i.e. handoff from one TCH to another TCH of the same cell sector.

b. Inter-cell, Intra-site TCH-TCH handoff, i.e. handoff from TCH on one cell sector to TCH on another cell sector of the same cell site.

c. Inter-cell, Intra-BSC TCH-TCH handoff, i.e. handoff from TCH on one cell sector to TCH on another cell sector of a different cell site on the same BSC.

d. Inter-cell, Inter-BSC TCH-TCH handoff, i.e. handoff from TCH on one cell sector to TCH on another cell sector of a different cell site on a different BSC.

e. Inter-cell, Inter-MSC TCH-TCH handoff, i.e. handoff from TCH on one cell sector to TCH on another cell sector of a different cell site on a different MSC.

f. Inter-cell, Intra-site SACCH-SACCH handoff, i.e. handoff from SACCH on one cell sector to SACCH on another cell sector of the same cell site.

g. Inter-cell, Intra-BSC SACCH-SACCH handoff, i.e. handoff from SACCH on one cell sector to SACCH on another cell sector of a different cell site on the same BSC.

h. Inter-cell, Inter-BSC SACCH-SACCH handoff, i.e. handoff from SACCH on one cell sector to SACCH on another cell sector of a different cell site on a different BSC.

i. Inter-cell, Inter-MSC SACCH-SACCH handoff, i.e. handoff from SACCH on one cell sector to SACCH on another cell sector of a different cell site on a different MSC.

Figure 3B:
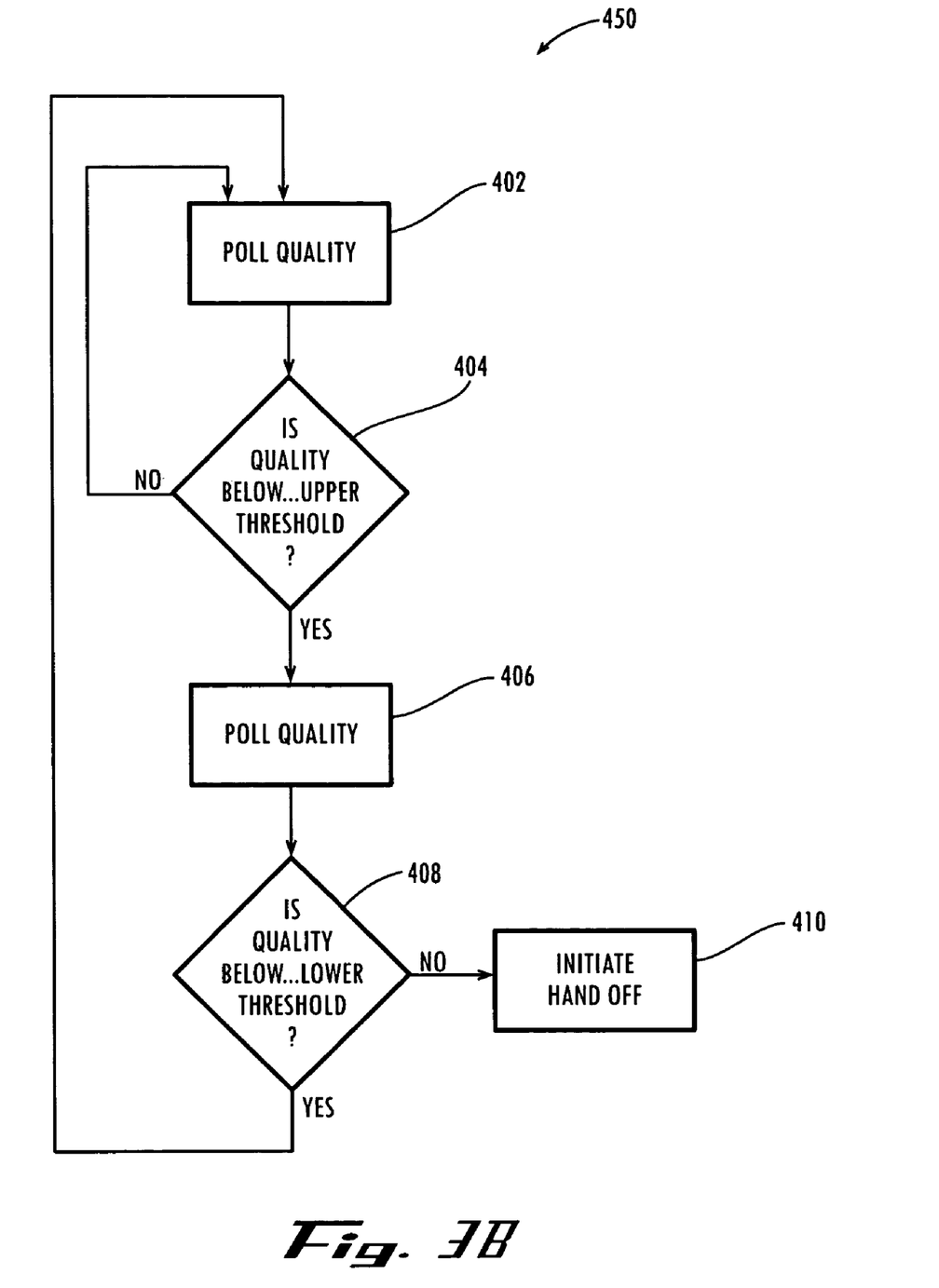
FIG. 3B shows a flow diagram illustrating another handoff scheme in accordance with exemplary embodiments of the present invention in which both an upper threshold and a lower threshold are used for determining whether a handoff is to initiated.

Referring now to FIG. 3B there is shown a flow diagram 450 illustrating another handoff scheme in accordance with exemplary embodiments of the present invention which is the same as that shown in FIG. 3A with the addition of another quality measurement polling operation, as indicated by block 406. Prior to and following the second polling step 406, operation is the same as that described in FIG. 3A. However, this second quality polling step 406 provides an option for a time delay such that a network operator can vary the time between an affirmative response (i.e., a determination that the quality measurement is below the upper threshold $Q_{T1}$) from determination step 404 and the subsequent determination step 408. In this manner, the network operator is enabled to tune the system, such that the delay can be added to represent a time needed for completing a successful handoff, for example. This would be advantageous in those circumstances when the quality measurement is only briefly within the safe zone 320 subsequently falling into the tenuous zone before a successful handoff can be completed. Assuming the delay is tuned to be greater than that time between $t_0$ and $t_1$, no handoff would be initiated until after the quality measurement returns to the safe zone 320 (which in this example is time $t_2$).

The second polling step 406 may also be implemented to allow a different accumulation/weighting/averaging mechanism for comparing signal quality to lower threshold than the one used for comparing signal quality to upper threshold. Such a different accumulation/weighting/averaging mechanism can allow the operator to further fine tune handoff performance for increased reliability.

The quality measurement can be a measurement of the signal strength or of the signal clarity. Alternatively, it can be a measurement of the accuracy of information passing back and forth, or it can be other measurements. One quality measurement that can be employed according to the present invention is a measure known in the industry as "receive quality" (RXQUAL). RXQUAL is known in the wireless mobile communications industry as an air interface quality parameter and, more particularly it is a logarithmic measure of the bit error rate (BER) quantized in eight levels; zero is the lowest BER (i.e., best performance) and seven is the worst case. Thus, a larger numerical value is indicative of a lower call quality and a lower numerical value is indicative of a higher call quality. For example, if RXQUAL is to be used as the quality measurement monitored, the step of handoff initiation may be carried out when the RXQUAL measurement is some numerical value or within some numerical range (e.g., equal to or greater than five and less than seven).

Other quality measurements may be utilized in the present invention. For example, the quality measurement known as carrier-to-interface ratio (C/I) can be utilized. Another quality measurement that may be employed is a measurement of frame error rate. Yet another quality measure known in the wireless industry that could be employed is the "receive level" ("RXLEV") which is a parameter of a signal strength measure quantized typically into 64 levels. Other quality measurements might also be employed to good effect in the present invention. Moreover, while the present invention is described with specific reference to comparing a single quality aspect or parameter with upper and lower thresholds, multiple quality parameters can be compared with respective upper and lower thresholds to make the decision of whether to initiate a call handoff. In other words, it is possible to consider multiple quality parameters in making the decision of whether to initiate the call handoff.

Moreover, one way of carrying out the present invention is to utilize current data, or the most current (most recent) data, for the quality measurement to evaluate whether to initiate the call handoff or not. Alternatively, previous data in addition to the current data could be taken into account. For example, very recent information about the quality measurement could be considered alone or in conjunction with the prior quality measurement in deciding whether to handoff the call or not, still utilizing upper and lower thresholds.

Described embodiments of the present invention can be applied to a wide variety of cellular access technologies, including but not limited to time-division multiple access (TDMA), code-division multiple access (CDMA), universal mobile telecommunications system (UMTS) and global system for mobile communications (GSM). It should be noted that while the present invention has been described with reference to particular embodiments, the present invention is not limited to these embodiments. Persons skilled in the art will understand, in view of the description provided herein, that many variations can be made to the embodiments described herein without departing from the scope of the invention. For example, the present invention is not limited to any particular type of wireless network. Also, the present invention is not limited to any particular type of quality measurement. Furthermore, the present invention is not limited to any particular type of accumulation, averaging or weighting of signal quality measurements. Other variations may be made to the embodiments described herein and all such variations are within the scope of the present invention.

The invention claimed is:

1. A method comprising:
   measuring a quality relating to at least one aspect of a communication between a mobile wireless device and a first cell, cell sector, or channel in at least a first measurement and a second measurement in readiness for potentially handing off the communication of the mobile wireless device from the first cell, cell sector, or channel to a second cell, cell sector, or channel;
   determining, in a first determination, whether the first measurement is equal to or less than a first threshold;
   determining, in a second determination, whether the second measurement is equal to or greater than a second threshold; and
   initiating a handoff from the first cell, cell sector, or channel to the second cell, cell sector, or channel based on, when the first determination determines the first measurement is equal to or less than the first threshold and the second determination determines the second measurement is equal to or greater than the second threshold, wherein the first threshold represents a higher quality measure than the second threshold, and wherein the second threshold is greater than zero or less than zero.

2. The method of claim 1, wherein the initiating comprises:
   continuing to maintain the communication while the quality is higher than the first threshold and lower than the second threshold.

3. The method of claim 1, wherein the measuring comprises:
   measuring in the first measurement and the second measurement at least one of an uplink signal quality or a downlink signal quality of the at least one aspect.

4. The method of claim 1, further comprising:
   polling the quality in at least a first polling and a second polling;
   determining whether the first polling is less than the first threshold;
   determining whether the second polling is greater than the second threshold; and
   initiating the handoff based on the first polling and the second polling.

5. The method of claim 1, further comprising:
   polling the quality in at least a first polling and a second polling;
   determining whether the first polling is less than or substantially equal to the first threshold utilizing at least one of a first accumulating technique, a first weighting technique, or a first averaging technique;
   determining whether the second polling is greater than or substantially equal to the second threshold utilizing at least one of a second accumulating technique different than the first accumulating technique, a second weighting technique different than the first weighting technique, or a second averaging technique different than the first averaging technique; and
   initiating the handoff based on the first polling and the second polling.

6. The method of claim 1, further comprising:
   polling the quality in at least a first polling and a second polling;
   determining whether the first polling is less than the first threshold;
   determining whether the second polling is greater than the second threshold, wherein the second polling evaluates signal quality differently than the first polling; and
   initiating the handoff based on the first polling and the second polling.

7. The method of claim 1, wherein the measuring comprises:
   measuring in the first measurement and the second measurement at least one of a signal strength or a signal quality of the at least one aspect of the communication between the mobile wireless device and first cell, cell sector, or channel.

8. The method of claim 1, further comprising:
   initiating a handoff from a current serving traffic channel to a second traffic channel in response to a quality of the current serving traffic channel being less than the first threshold and greater than the second threshold.

9. The method of claim 8, further comprising:
   providing the current serving traffic channel via a first cell site; and
   providing the second traffic channel via a second cell site.

10. The method of claim 8, further comprising:
    providing the current serving traffic channel via a first cell sector of a cell site; and
    providing the second traffic channel via a second cell sector of the cell site.

11. The method of claim 1, further comprising:
    initiating a handoff from a current serving control channel to a second control channel in response to the quality of the current serving control channel being less than the first threshold and greater than the second threshold.

12. The method of claim 11, further comprising:
    providing the current serving control channel via a first cell site; and
    providing the second control channel via a second cell site.

13. The method of claim 11, further comprising:
    providing the current serving control channel via a first cell sector of a cell site; and
    providing the second control channel via a second cell sector of the cell site.

14. The method of claim 1, further comprising:
adding a delay between the first determination and the second determination, wherein the delay represents a time related to completing the handoff from the first cell, cell sector, or channel to the second cell, cell sector, or channel.

15. A system comprising:
a controller coupled to a plurality of transceivers and configured to:
measure in at least a first measurement and a second measurement a parameter associated with a quality of a communication between a mobile wireless device and a first transceiver of the plurality of transceivers, wherein the first transceiver currently facilitates the communication; and
initiate a handoff of the communication to a second transceiver of the plurality of transceivers in response to a first result of the first measurement and a second result of the second measurement being within a first predetermined range that is based on a first threshold and a second threshold.

16. The system of claim 15, wherein the predetermined range is a region between a first threshold and a second threshold, the first threshold is associated with a higher communication quality than the second threshold.

17. The system of claim 16, wherein the controller is further configured to:
continue to maintain the communication with the first transceiver in response to the parameter being greater than the first threshold and less than the second threshold.

18. The system of claim 15, wherein the controller is further configured to:
measure in at least a third measurement and a fourth measurement an other parameter associated with the quality of the communication between the mobile wireless device and the first transceiver; and
initiate the handoff of the communication to the second transceiver in response to the other parameter being within a second predetermined range.

19. The system of claim 16, wherein the controller is further configured to:
poll the parameter in at least a first poll and a second poll;
determine whether the first poll is less than the first threshold;
determine whether the second poll is greater than the second threshold; and
initiate the handoff based on the first poll and the second poll.

20. The system of claim 16, wherein the controller is further configured to:
poll the parameter in at least a first poll and a second poll;
determine whether the first poll is less than the first threshold; and
determine whether the second poll is greater than the second threshold.

21. The system of claim 16, wherein the controller is further configured to:
initiate the handoff from a current serving traffic channel to another traffic channel in response to a quality of the current serving traffic channel being equal to or less than the first threshold and substantially equal to or greater than the second threshold, the parameter specifies the quality.

22. The system of claim 16, wherein the controller is further configured to:
initiate the handoff from a current serving control channel to another control channel in response to a quality of the current serving control channel being equal to or less than the first threshold and substantially equal to or greater than the second threshold, the parameter specifies the quality.

23. The system of claim 20, wherein the controller is further configured to at least one of:
add a delay between the first poll and the second poll;
average parameters to compute signal quality associated with the first poll or the second poll; or
accumulate results associated with the first poll or the second poll.

24. The system of claim 15, wherein the plurality of transceivers are configured to serve distinct geographical areas, and communicate with the mobile wireless device over a radio link.

25. A wireless system, comprising:
at least one component configured to:
measure in a first measurement and a second measurement a quality measure of a communication between a wireless device and a first cell, cell sector, or channel; and
transfer a call associated with the wireless device from the first cell, cell sector, or channel to a second cell, cell sector, or channel in response to a result of the first measurement and the second measurement being within a predetermined range that is based on a first threshold and a second threshold.

26. The wireless system of claim 25, wherein the quality measure comprises a signal strength or a signal quality of at least one aspect of the communication.

* * * * *